US011954402B1

(12) United States Patent
Rogers (10) Patent No.: US 11,954,402 B1
(45) Date of Patent: Apr. 9, 2024

(54) TALK STORY SYSTEM AND APPARATUS

(71) Applicant: Henk B. Rogers, Honolulu, HI (US)

(72) Inventor: Henk B. Rogers, Honolulu, HI (US)

(73) Assignee: Henk B. Rogers, Honolulu, HI (US)

( * ) Notice: Subject to any disclaimer, the term of this patent is extended or adjusted under 35 U.S.C. 154(b) by 0 days.

(21) Appl. No.: 18/071,209

(22) Filed: Nov. 29, 2022

(51) Int. Cl.
G06F 3/16 (2006.01)
G06F 3/0482 (2013.01)
G06F 3/04847 (2022.01)

(52) U.S. Cl.
CPC ............ G06F 3/165 (2013.01); G06F 3/0482 (2013.01); G06F 3/04847 (2013.01)

(58) Field of Classification Search
CPC ..... G06F 3/165; G06F 3/0482; G06F 3/04847
See application file for complete search history.

(56) References Cited

U.S. PATENT DOCUMENTS

| 7,996,432 | B2 * | 8/2011 | Coffman | G06F 16/48 |
| | | | | 707/804 |
| 8,495,235 | B2 * | 7/2013 | Little | H04L 65/612 |
| | | | | 709/231 |
| 9,268,465 | B1 * | 2/2016 | Yari | G06Q 50/01 |
| 9,521,175 | B2 | 12/2016 | Rogers | |
| 9,779,114 | B2 | 10/2017 | Rogers | |
| 2009/0216743 | A1 * | 8/2009 | Coffman | G06F 16/61 |
| | | | | 707/999.005 |
| 2009/0216805 | A1 * | 8/2009 | Coffman | G06F 16/48 |
| 2012/0254709 | A1 * | 10/2012 | Cok | G06F 16/51 |
| | | | | 715/202 |
| 2014/0086450 | A1 * | 3/2014 | Huang | G06V 40/167 |
| | | | | 382/103 |
| 2014/0337126 | A1 * | 11/2014 | Ohanyan | G06Q 30/0251 |
| | | | | 705/14.49 |
| 2016/0294894 | A1 * | 10/2016 | Miller | H04L 65/401 |
| 2017/0126786 | A1 * | 5/2017 | Satkunarajah | G06F 3/04842 |
| 2021/0357447 | A1 * | 11/2021 | McKenzie | G06F 16/638 |
| 2022/0044309 | A1 * | 2/2022 | Jose | G06Q 30/0621 |

FOREIGN PATENT DOCUMENTS

| AU | 2006249239 A1 * | 6/2008 | ....... G06F 17/30038 |
| AU | 2012232990 A1 * | 4/2014 | |
| BE | 1027349 A1 * | 2/2021 | |
| CN | 103959314 A * | 7/2014 | ......... G06F 16/5866 |
| CN | 113127628 A * | 7/2021 | |
| JP | 2008292740 A * | 12/2008 | |

(Continued)

OTHER PUBLICATIONS

Technical Guidelines for Digitizing Cultural Heritage Materials, 3d Ed (Federal Agencies Digital Guidelines Initiative Jun. 2022).

(Continued)

*Primary Examiner* — Shourjo Dasgupta
(74) *Attorney, Agent, or Firm* — Nixon & Vanderhye P.C.

(57) ABSTRACT

A multimedia system records audio segments and allows speakers and other users to select recorded audio segments as "Loved" or "Kept" for selective later playback in a timed sequence in association with corresponding images. A concept of telerecording is that one can call their relative in another country and ask them to explain what's going on in a picture. This way we can record their voices without having to travel to wherever they live.

18 Claims, 11 Drawing Sheets

Weighted Random Number Generator (56) References Cited

FOREIGN PATENT DOCUMENTS

| JP | 2018523386 A | * | 8/2018 | |
|---|---|---|---|---|
| KR | 20160098948 A | * | 8/2016 | |
| WO | WO-2022121753 A1 | * | 6/2022 | ........... G06F 16/957 |
| WO | WO-2023038911 A1 | * | 3/2023 | |

OTHER PUBLICATIONS

Efraimidis, P.S. Weighted Random Sampling over Data Streams. In: Zaroliagis, C., Pantziou, G., Kontogiannis, S. (eds) Algorithms, Probability, Networks, and Games. Lecture Notes in Computer Science( ), vol. 9295. Springer, Cham., https://doi.org/10.1007/978-3-319-24024-4_12 (2015).

* cited by examiner

FIG. 6
Block Diagram

FIG. 7
Audio Segments

FIG. 8
Block Program(s)

TALK STORY SYSTEM AND APPARATUS

FIELD

The technology herein relates to technological systems and methods for facilitating the recording of oral histories and narratives accompanied by images and other multimedia.

BACKGROUND

Louis Daguerre's 1839 invention of modern photography in Paris changed completely how we view of our history and past. Images that previously could only be painstakingly drawn or painted or described in words could suddenly be captured quickly and reliably as photographs.

In the early days of photography, every photograph was precious. The earliest photographs were kept in special individual cases to protect them. Often, the name of the photographer who took the photograph was imprinted on the case, and the owner often wrote a description of the scene on the back of the case or on a note attached to the case. But the identity of people and places in many early photographs are lost to time.

As photographs became easy to produce and more commonplace, owners of photographs often mounted the photographs in books called "photo albums"—a kind of personal scrapbook that often included a caption for each photograph indicating when it was taken and what and/or who it showed. Thus, in the past, photos were often stored and presented on separate physical media that could be labeled by hand or machine to identify associated content. For example, it was common to label each photo in a photo album with a caption by writing on the photographic paper or other physical medium on which the photo was printed or mounted.

Anyone who has looked through an old photo album knows that such captions might end up being the only record of who is in the photo, where and when the photo was taken and what event the photo shows. On the other hand, old photos without captions or labels are a puzzle or enigma; it may be impossible to identify who they show or much or any other information about the image.

The digital revolution has radically changed the situation. Most of us now carry handheld devices that can capture high resolution still and moving color images which we can store on servers in the cloud and post to social media for others to view and enjoy. Such posts often include descriptive text. Today most digital photo viewing is now done by looking at a screen.

Unfortunately, taking photos has become simple and nearly instantaneous but composing descriptive text for the images has become time-consuming and labor-intensive. Imagine typing in descriptive text for each of the 3000 photos you took on your last vacation or even the 250 photos you took or collected at the baby shower, wedding or birthday party.

Automatic techniques that analyze media items and identify them are known. For example, artificial intelligence (AI) is now commonly used to recognize and match image patterns, grouping digital photos together by commonalities such as people shown in the photos, time or places the photos were taken, or even subject matter such as "food", "sunsets" or "the beach." For example, automatic face identification algorithms can be used to identify portions of digital photos or videos that contain faces. However, as of this filing, the kinds of photo shows AI puts together automatically are often disorganized and look nothing like a selection of images a human would curate for presenting to family or friends. Thus, even with machine-learning approaches, a human is often asked to identify or confirm who the identified face belongs to and compose a description that will capture memories or tell a story to someone who was not present when photos were taken. Automatic algorithms may then abstract patterns associated with identified elements, and use pattern matching and recognition to automatically identify additional occurrences of the same pattern in other media items within a collection. These techniques, while helpful, do not solve the problem. In particular, a machine can never replace the human factor when it comes to memory, emotion and human connection. Having an old family photo analyzed by an AI engine is unlikely to reveal anything particularly useful or entertaining.

An easy, interesting and innovative way to manipulate and tag photos while viewing photos using display devices with processing and sound receiving capability is to apply voice tags. Voice tagging in the context of capturing voice information or narrative with a smart phone, tablet or other device can provide highly advantageous features and advantages. See for example commonly-assigned U.S. Pat. Nos. 9,521,175 & 9,779,114. But, just as photographic technology continues to improve, further improvements are desirable.

DETAILED DESCRIPTION OF EXAMPLE NON-LIMITING EMBODIMENTS

Figure 1:
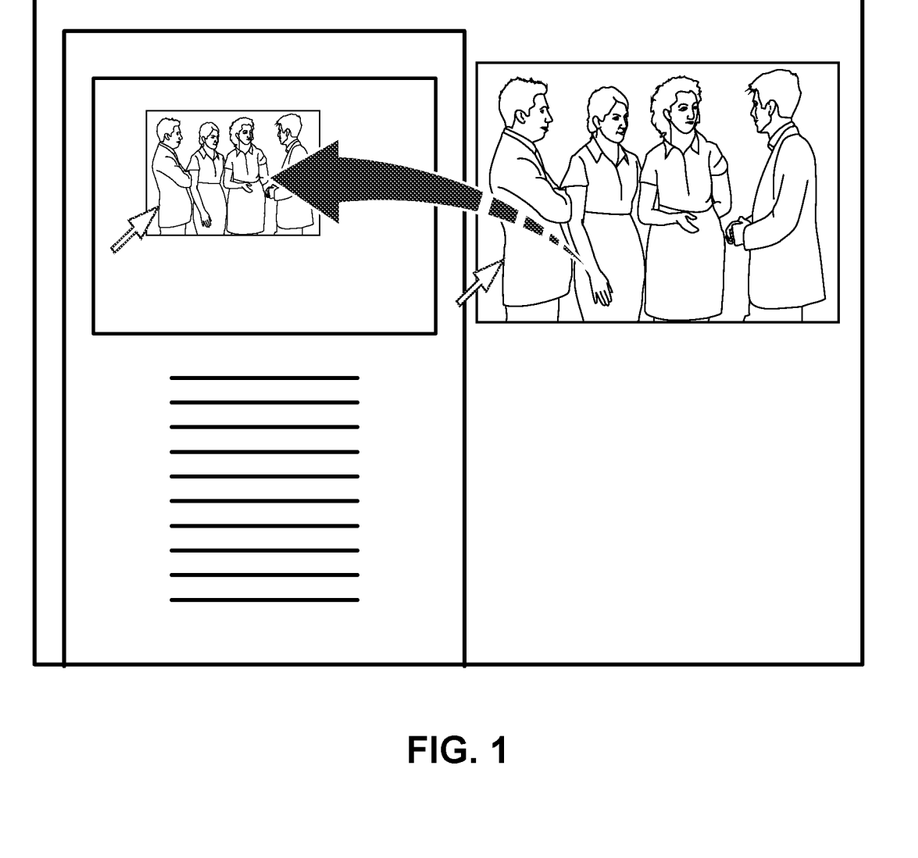
FIG. 1 shows an example display of an image being selected/dragged into a talk story application.

FIG. 1 shows an example image to be selected on the right-hand side of an electronic presentation device such as a tablet, smart phone or other touch screen or other display device. In this case, the image can be captured in any desirable way such as for example using a camera built into the display device or a separate camera, downloaded from a server or otherwise over a network, scanned in from other media such as a hard copy photograph, etc. The image can be displayed on the display device using any kind of application such as a photo viewer, image viewer, image editor, photo organizer, etc.

Suppose one wants to incorporate the image into a "talk story" presentation. In the example shown, the first step is to copy the image from the right-hand side of the display shown to the lefthand side (see FIG. 1), thereby selecting the image for incorporation in a presentation that may be similar in some ways to a curated slide show. This can be done for example by dragging the image from the photo or image viewing application on the right hand side to the talk story application on the left hand side, or in some other way. This dragging can be done in a conventional way using a finger on a touch screen, a mouse movement, a spoken command, etc. Thus, as the image on the right hand side is clicked or otherwise selected and dragged to the lefthand side of the presentation, a version of the image (which can be the same size or resolution or a different size or resolution) is copied into the lefthand side of the presentation (in this case corresponding to a talk story application). This functionality allows easy importing of images from an image storage and management application such as "Photos" to a different, talk story application. In other embodiments, other ways of selecting the right-hand photo for incorporation into the slide show (e.g., voice commands) can be used, or the same application can provide both the photo storage/management/viewer and the talk story functionality. Furthermore, in some embodiments, the photo or image being copied can be dragged from left to right instead of from right to left, or from an upper position to a lower position, or from a lower position to an upper position, or could be transferred from one display device to another display device, from one screen to another screen, etc.

Figure 2:
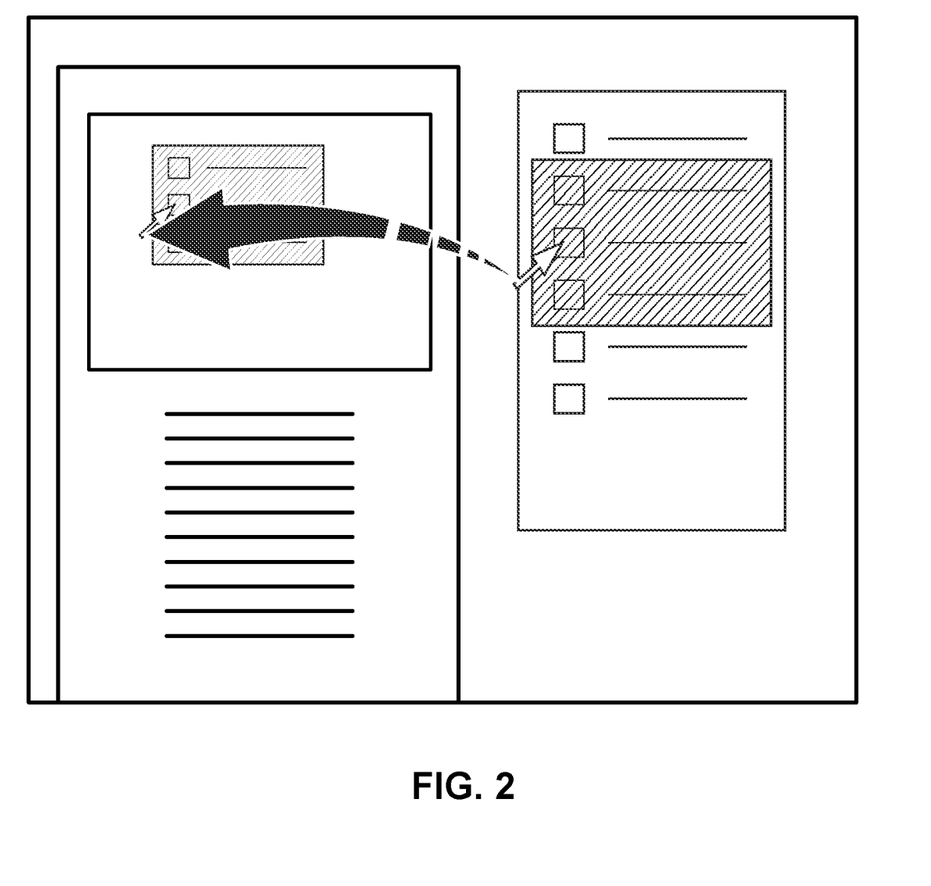
FIG. 2 shows an example display of multiple images being selected/dragged into a talk story application.

FIG. 2 shows how multiple photos or other images can be copied into the talk story application at the same time. In this case, the multiple photos can be displayed in a list format such as in the form of thumbnails (small versions of the photos), icons or other image and/or text representations. In this case, the small squares are thumbnails of the pictures. Each thumbnail can be identified by a line of text that could identify time/date created, short description, etc. These thumbnails may be selected for example by highlighting, marking, checking a box or otherwise marking so that multiple thumbnails or images are selected at the same time. The diagram shows multiple photos being dragged into the talk story application all at once.

In example embodiments, the talk story application may include a non-volatile storage area that stores the imported images and/or indices to the imported images. For example, in one example, each image imported into the talk story application may be stored locally or remotely in a talk story archive storage. In other example, the images imported into the talk story application may remain where they are (e.g., on a local or remote server) and indices such as Universal Resource Locators (URLs) of the images may be stored in the talk story application. To duplicate the longevity of a physical photo album, the archival storage the talk story application maintains may be semi-permanent or permanent, and the images may be encoded in a simple way so that they can be read and displayed in the future after image compression standards, display resolutions, etc. have been changed or updated. See e.g., Technical Guidelines for Digitizing Cultural Heritage Materials, 3d Ed (Federal Agencies Digital Guidelines Initiative June 2022); and digital photograph standards such as TIFF, JPEG2000, PNG, JPEG, DNG, BMP, GIF. In one example, the talk story application may convert imported images to archival formats for extended term access and storage.

Figure 3:
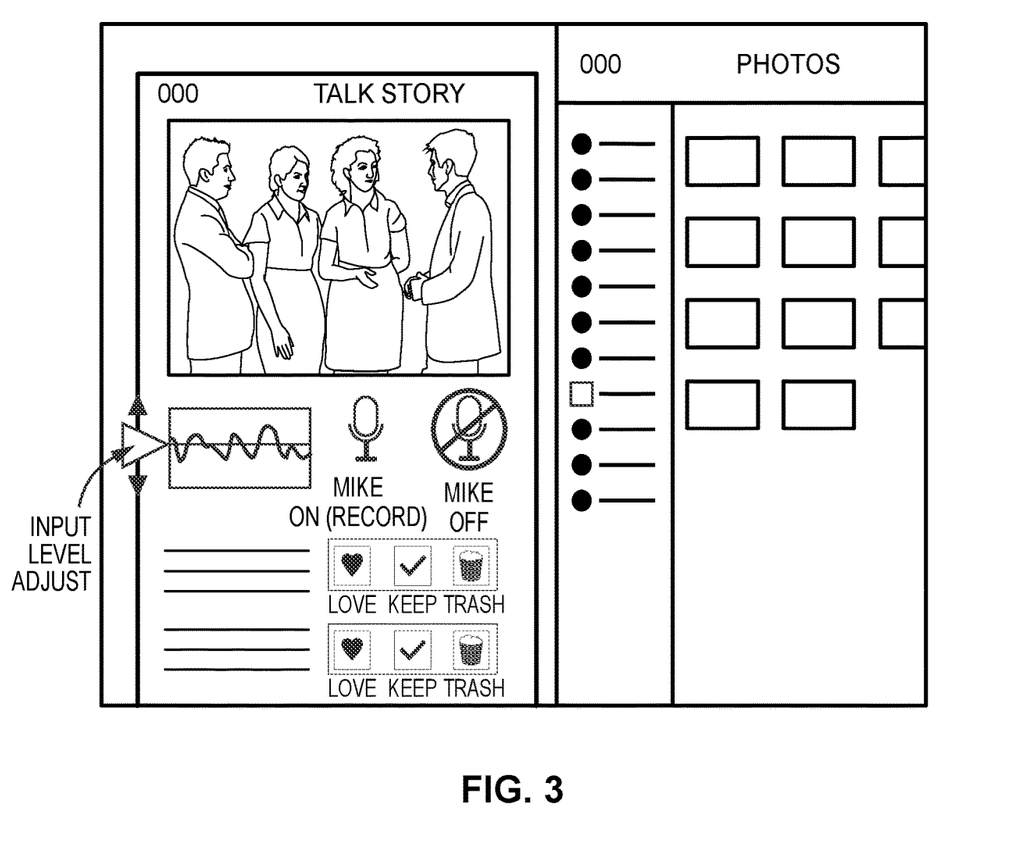
FIG. 3 shows an example sound recording display for a talk story application.

FIG. 3 shows a further screen of an example talk story application used for creating and curating an archival presentation. The right-hand panel of the talk story application shows various photos or other images that have been imported into the talk story application in the manner described above. These photos or images can be displayed at any size and there can be any number. In the example shown, the photos or images are arranged in rows and columns, but they could be organized e.g., as a scrollable list or in some other fashion. The left-hand portion of the display shows the display of a current image and provides various controls that enable a user to record audio segments in association with the displayed image. Also shown in a center column of the display is a list of audio segments that have already been recorded in association with a photo.

An example functionality of the talk story application is to record audio content such as voice narration for association with selected images and for automatic playback with the images when the images are shown. While conventional video voiceovers are of course well known, the narration features provided by the talk story application are different and unique. For example, to keep irrelevant conversation from being stored with a picture and to allow editing, the talk story application includes a voice to text component. As or after a voice segment is recorded, the user can quickly decide which bits or segments of voice to keep with the help of a transcript produced by the voice to text conversion component. In one embodiment, when the user selects "record" (e.g., by pressing the touch screen "Mike On (Record)" icon, giving a voice command, operating a control, or by default, etc., the talk story application will use a microphone (which may be part of or separate from the display device) to record sounds in the environment including talk narrative. Furthermore, the spoken narrative will be stored in a way that corresponds to the image being displayed (as indicated for example by the box in the list of items in the center column of the display). Thus, the user can record different narrative segments for different images, and the talk story application will automatically keep track of which recorded narrative segment goes with which image.

In one embodiment, whenever a picture is on the screen, talk story is recording. If voice is detected, voice to text is working and the audio picked up by the microphone is also being digitized, recorded and stored in association with the picture. An indicator such as a flashing red light or color bar can inform users that the device is recording.

In one embodiment, a graphical input level display (e.g., a "VU meter", waveform display, etc.) displays an indication of level/volume and an input level adjust control allows the user to adjust the microphone or recording level. As the user speaks, the talk story application automatically converts the spoken speech to text for display on the lower lefthand corner of the display. In one embodiment, the microphone "on" is the default and the microphone is "on" unless "muted." It's like a telephone call or a video conference call. Often, the best voice comments will be spontaneous, not planned.

The talk story application divides the spoken speech corresponding to a particular image into "chunks" and displays a corresponding voice to text output block of text for each talk segment. The user can click on "Love", "Keep" or "Trash" buttons shown in the lower left-hand corner of the screen shown in FIG. 3 for each of the last few audio segments that have been recorded. All "trash" text and voice is discarded. The talk story application may or may not retain the text for later use—it may be used simply to allow the user to distinguish between recorded voice segments. Thus, next to each text block there are three different controls in one embodiment:

Love (or Favorite)
Keep
Trash.

Selecting "Love" or Favorite may mean this voice comment will be recorded/retained and will be played often.

"Keep" indicates that the voice (and associated text) will be recorded and maintained as an ordinary segment and be played occasionally.

Selecting "trash" means the voice segment will be placed in trash. This way they can be retrieved if accidentally erased.

The text shown could be a transcript of words actually spoken, or it could be an abstract of the words. For example, an AI engine or software filter could be used to provide a subject matter abstract of the text spoken so the user can know the subject matter of the audio chunk without having to read a full transcript. This could also be a translation of the voice comment into another language.

In this way, the example non-limiting embodiments allow a simple piecewise editing and priority or differentiating marking of voice segments in real time or later while recording and/or during playback. See FIG. 7 stored audio segment database. If the user presses or otherwise indicates "trash", the portion of the audio stream corresponding to the segment will be removed or excluded from the output or recorded or maintained stream. Both "Love" and "Keep" result in the corresponding voice segment being kept/maintained, but "Love" (Favorite) provides an additional marking that can be used to provide priority or other selection during automatic playback (see below) so that audio chunks that are "loved" will be played back more often. Thus, only the "Kept" comments are played back and "Loved" comments are a part of kept comments. In one embodiment, there is no time when Kept comments are played while Loved ones are not.

Figure 5:
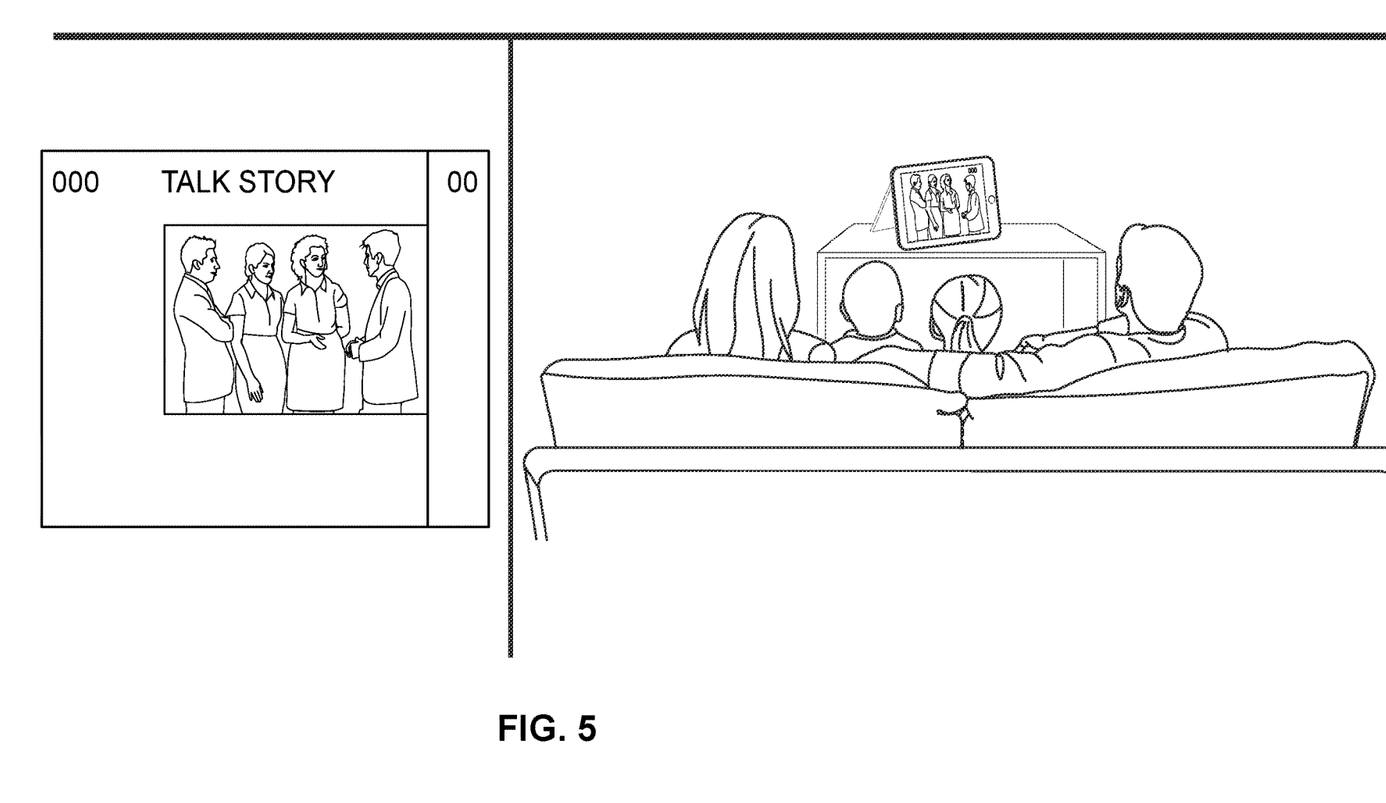
FIG. 5 shows an example remote playback and recording session for a talk story application.

FIG. 5 shows a telerecording example of how the owner of the photos can cause the photos to be shown in another location. The concept of telerecording is that the user can call or otherwise electronically contact a friend or relative in another location such as another country. In one embodiment, there is no need to ask for comments as spontaneous comments are the best. This way it is possible to record the friend or relative's voices without having to travel to wherever they live. The device they use to see the picture has the ability to record voice. The device could for example be a smart phone or other smart device connected to a television by airplay, but that would be a specific device instead of a category of devices. Preferably, the category of devices that are easiest to use can be ones that have both a display and a microphone. The simplest way to do "ask them to explain" is to:

1] Call someone
2] Share/show a picture
3] Record everything said by both parties
4] If either party says something about the picture, go over the transcript of the conversation that occurred while the picture was on-screen for both parties and mark the bits:
[ ] Love
[ ] Like (keep)
[ ] Trash The owner can sort comments into "Love", "Like" or "Trash"—thereby soliciting views from other viewers as to which part of the narrative are their favorite parts, which ones should be deleted, and which ones should be kept.

Figure 4:
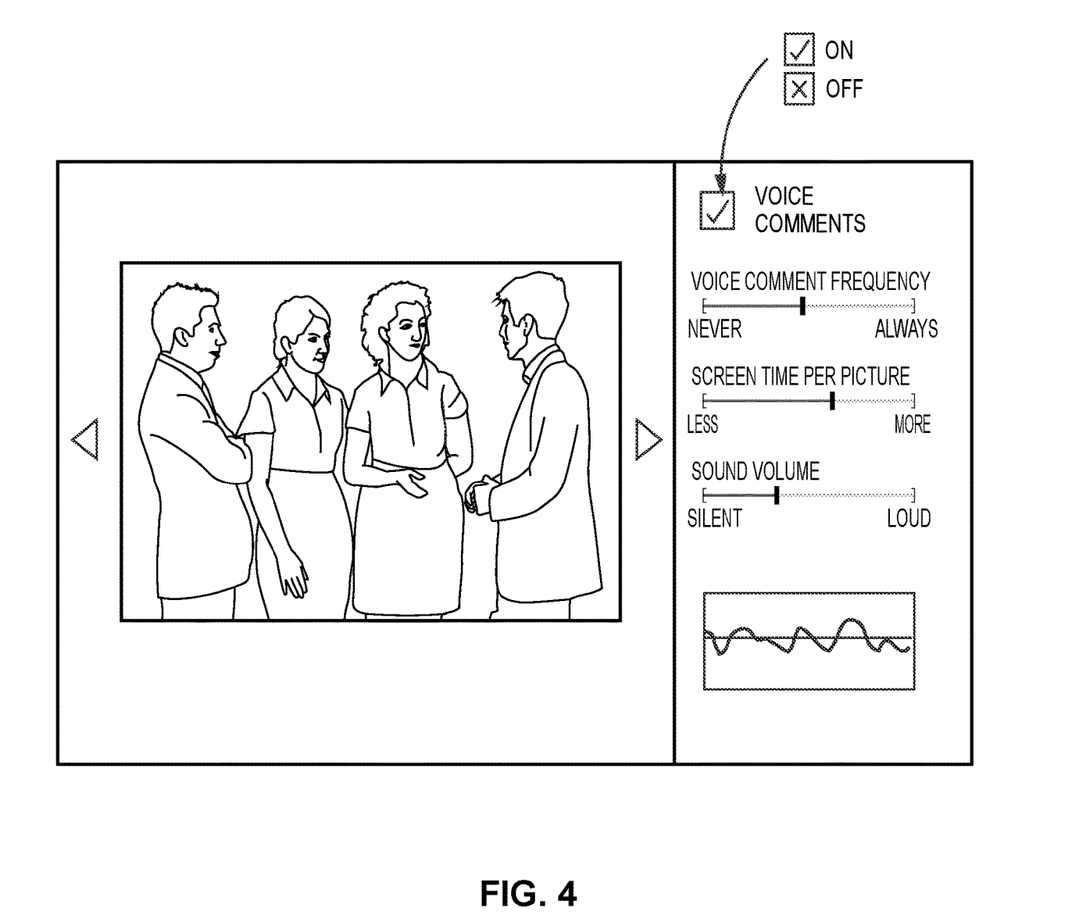
FIG. 4 shows an example playback display for a talk story application.

FIG. 4 shows a simplified playback display of the talk story application. The playback can include voice narration along with music and/or sound effects. In the example shown, the user can control how many (and/or the length of total) voice narration segments to play back for each image shown. For example, in this playback display example, voice comment frequency can be adjusted by a slider as follows:

Never <———-[ ]————>Always

The variable frequency can be used to make sure each slide show is unique (different photos in different order and different voice comments with each photo).

If there are people actively engaged in watching a slideshow, every picture could have a voice comment. If it's a picture frame on the wall, it could say something every 10–15 minutes. This frequency may be adjusted to make sure voice comments don't become annoying. Also there could be more than one comment on a given picture. In that case, during a slideshow, the talk story app will randomly or pseudo-randomly choose between saved comments. "Loved" comments will have a higher chance of being heard. If the app is being used picture by picture and only leaving a picture when a button is pressed, more voice comments can be heard for that particular picture while the users are looking at that picture.

Using the simple command buttons shown in the right-hand portion of the FIG. 4 example screen, it is thus possible to control playback as follows:

Voice comment frequency controls how often voice comments are offered
Sound volume controls is the same thing as how loud the voice comments are played
Screen time per picture controls how long each picture is displayed
An optional waveform with the slider on its side can graphically show sound level.

Other audio could be played back along with or instead of the above. For example, a music soundtrack could be provided as background behind the comments. The music soundtrack could play irrespective of the state of the selections above. Other control interfaces could provide fewer or different controls.

Playback order can be varied in some embodiments. For example, pictures can be displayed in a predetermined sequence, a random order or in user-selectable order (see below discussion regarding FIG. 10). In one embodiment, when a picture is on on a playback device, selected commentator's comments are played; 90% of the time, comments marked "Love"/"Like" (or Favorite) are played. The other 10% of the comments are from the "Keep" or "Saved" category. In one embodiment, multiple comments for the same picture are heard in random order (or sequentially if an observer insists).

There is also in the righthand side a slider control allowing the user to increment or decrement the seconds of screen time per picture. In the example shown, the playback mode can automatically advance from one image to the next in a slide show of sequential images, with a selectable display time for each image. It is possible to enable programming of different display times for different images, or each image can be displayed for the same selectable display time such as a 30 second default. In one example, the playback selects corresponding voice narration to play back during the image display, and may select, shorten (e.g., by speeding up or truncating), or lengthen (e.g., by slowing down, introducing pauses between, or concatenating) recorded audio for playback depending on the image display time. For example, if the image display time is 30 seconds and a particular image has only 15 seconds of recorded audio associated with it, the playback can "fill" other portions of the time with music or other material to avoid "dead time." A "Ken Burns" effect comes into play here (zoom into a picture or slide around a picture). This keeps a static picture from going stale on a screen. Once a voice comment starts to play, the picture will not time out until the voice comment is done playing. If there is time left over on the picture screen time, another voice comment can play. Meanwhile, an image with more comments or more lengthy comments can remain on the screen longer, and an algorithm can thus decide (e.g., within a range) how long to display a particular image based on how much stored audio content and/or how much "loved" audio content is associated with the image.

Figure 6:
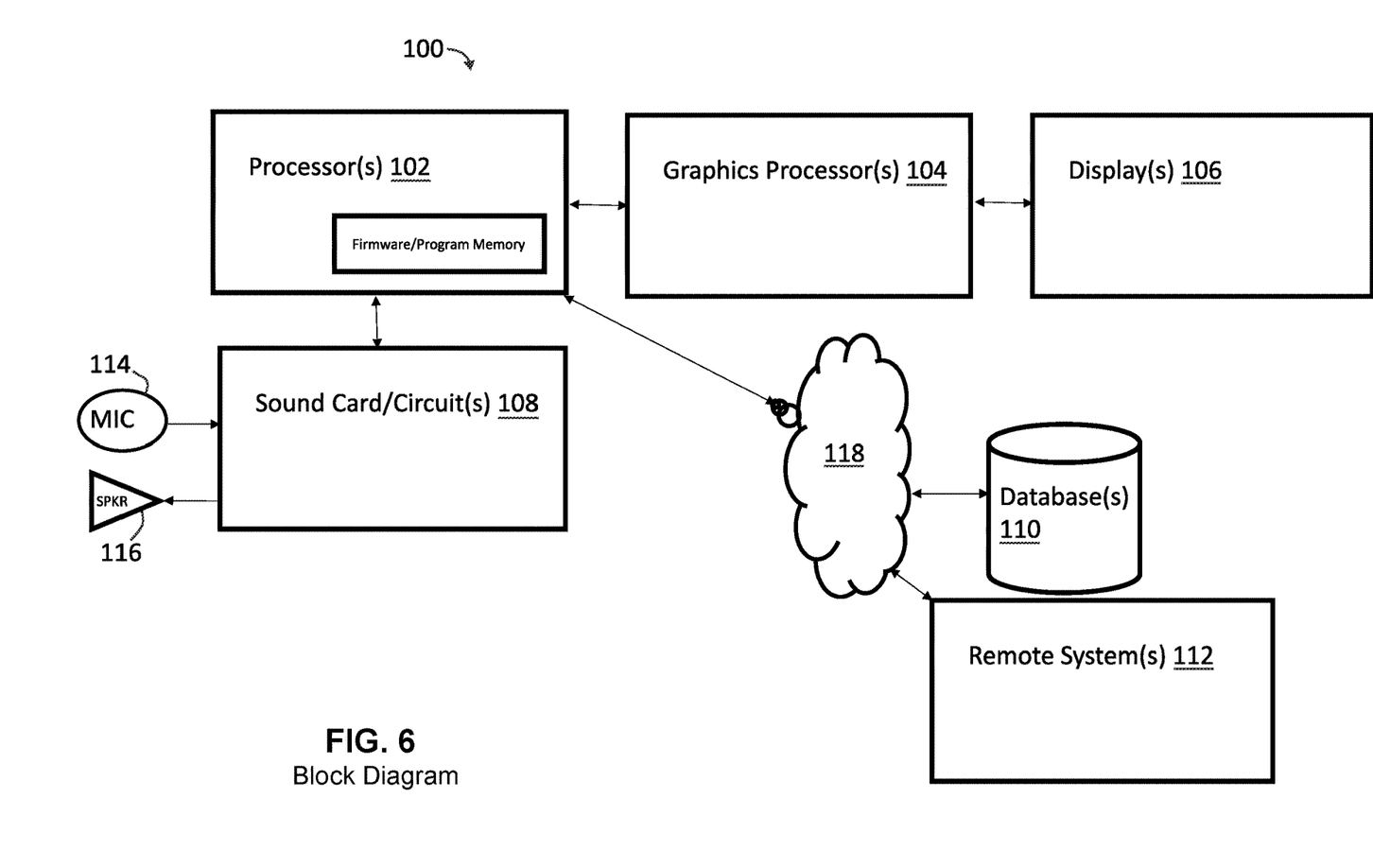
FIG. 6 shows a schematic block diagram of an example system.

FIG. 6 shows an example block diagram of a talk story system 100 including a processor(s) 102 communicating with a wired or wireless network 118, a graphics processor(s) 104, a display(s) 106), a sound card(s) 108 connected to a microphone 114 and a speaker, headphones or other sound output transducer 116. The processor(s) 102 execute software routines stored in firmware and/or program memory, such software including an image selection routine 202 (FIGS. 1-2), a recording/edit routine 204 (FIG. 3), a playback/edit routine 206 (FIG. 4), and a telerecording routine 208 (FIG. 5). The telerecording routine 208 establishes communication with a remote system 112 via network 118. Remote system 112 can have the same or similar configuration to system 100. The processor(s) 102 can also access images and other information from a remote database(s) 110 such as a cloud photo or image database, a social media server, etc. In one embodiment, the talk story application stores an archival version of imported images and recorded audio segments in an archival database 110 in the cloud so this information is available to any authorized user anywhere in the world at any time (including many years from now) using any kind of device.

Figure 7:
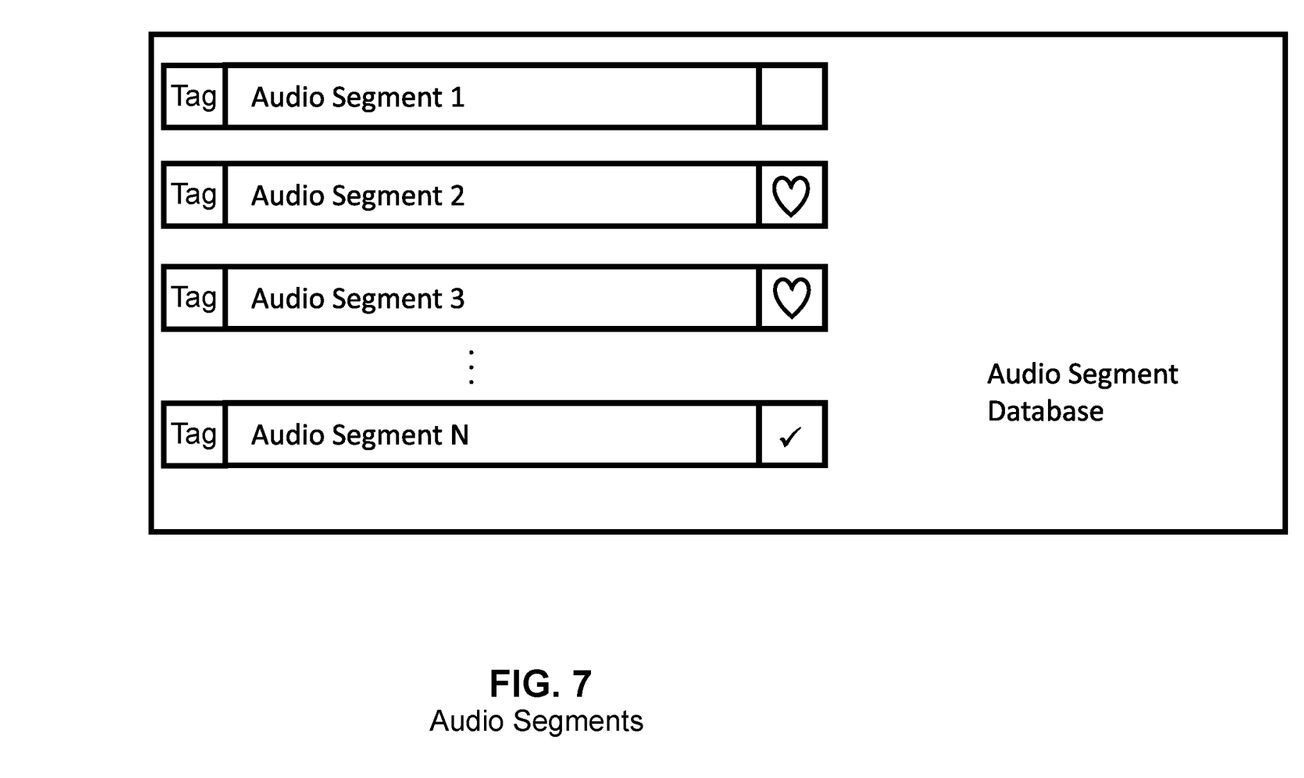
FIG. 7 shows an example stored audio segment database.

FIG. 7 shows an example archival database of recorded audio chunks stored in a non-transitory non-volatile memory device such as database 110. In the example shown, the stored audio chunks can be fixed or variable sizes, compressed or uncompressed, volume-intensity corrected, etc. Each stored audio chunk includes an identifier, index or tag that associates the audio chunk with a picture, and a flag that indicates whether the audio chunk is "loved" or merely "kept" to destined for trash. A talk story app device can store a local version of such files in non-volatile storage such as NAND flash memory, and periodically synchronize with a remote database 110 by copying to/from the remote database. In this way, a device can display a presentation when network connectivity is not available.

Figure 8:
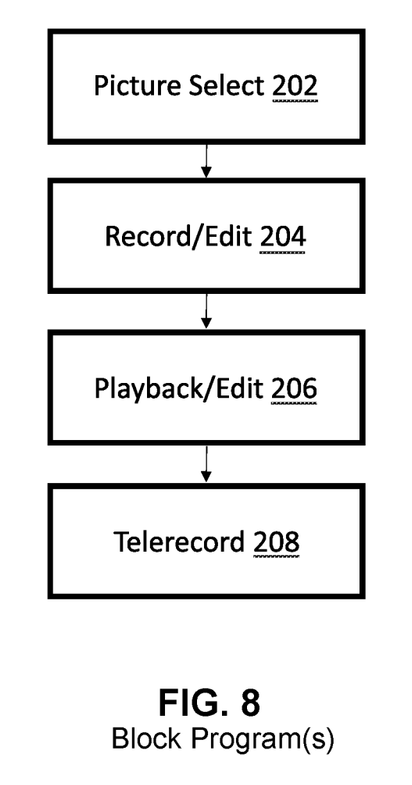
FIG. 8 shows example software/functional blocks.
Figure 9:
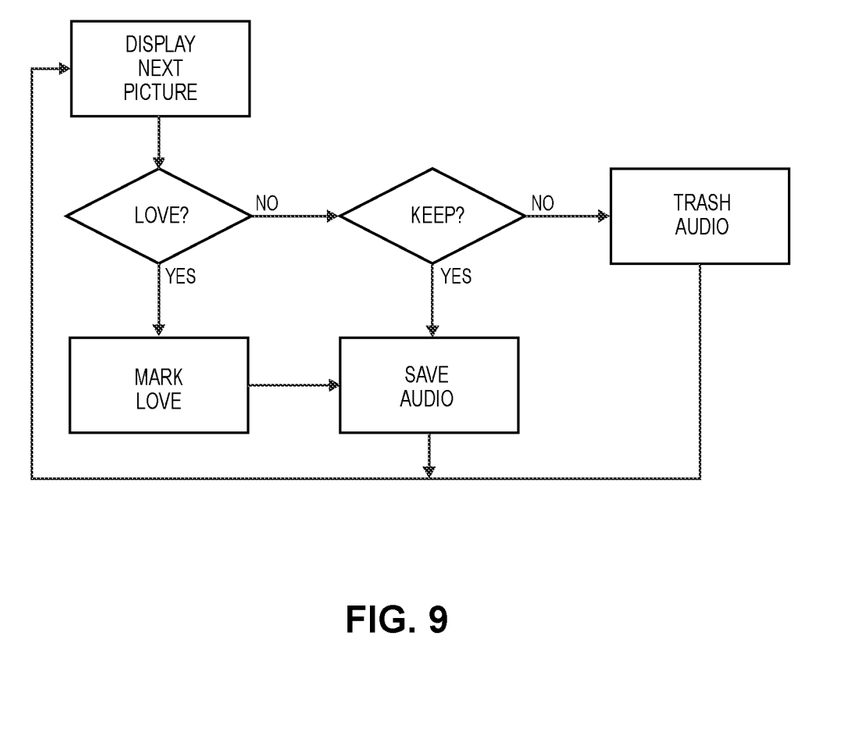
FIG. 9 shows an example flowchart of instruction-controlled steps performed by a processor to conduct a recording session.
Figure 10:
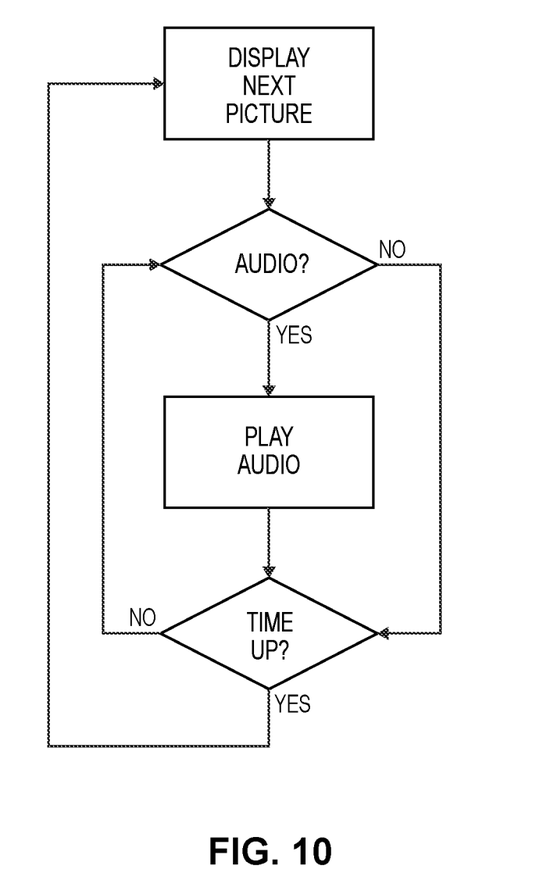
FIG. 10 shows an example flowchart of instruction-controlled steps performed by a processor to conduct a playback session.

FIGS. 8-10 show example steps performed by the FIG. 7 processor under control of software instructions stored in non-transitory memory. FIG. 8 shows a high level software architecture of the talk story app including picture selection 202, audio record/editing 204, playback/edit 206 and telerecord 208 as described above. Such functions are supported by utilities and/or operating system functionality such as storage/file system access, network connectivity, voice to text conversion, display routines, input/output routines, sound card or circuit software, etc.

FIG. 9 shows how in the process of recording/editing, digitized sound from the microphone is processed by the processor to detect speech whenever or while an image is displayed, and when speech is detected, the system stores the digitized speech and in real time converts the speech to text for display (or for display of an abstraction of the text). The system automatically parses the speech and divides the speech into chunks such as sentences, phrases or paragraphs (a deep neural network or a simpler algorithm that detects pauses or key words) could be used to detect when the subject of the narration changes to assist in dividing the speech into different chunks). The user may input "Love" for each chunk of recorded speech recorded in association with a displayed image, and the chunk will be so marked as shown in FIG. 7. Speech marked with "Keep" will also be saved. Speech that is neither Kept nor Loved will be placed into the trash (from whence it can be retrieved if desired).

Figure 11:
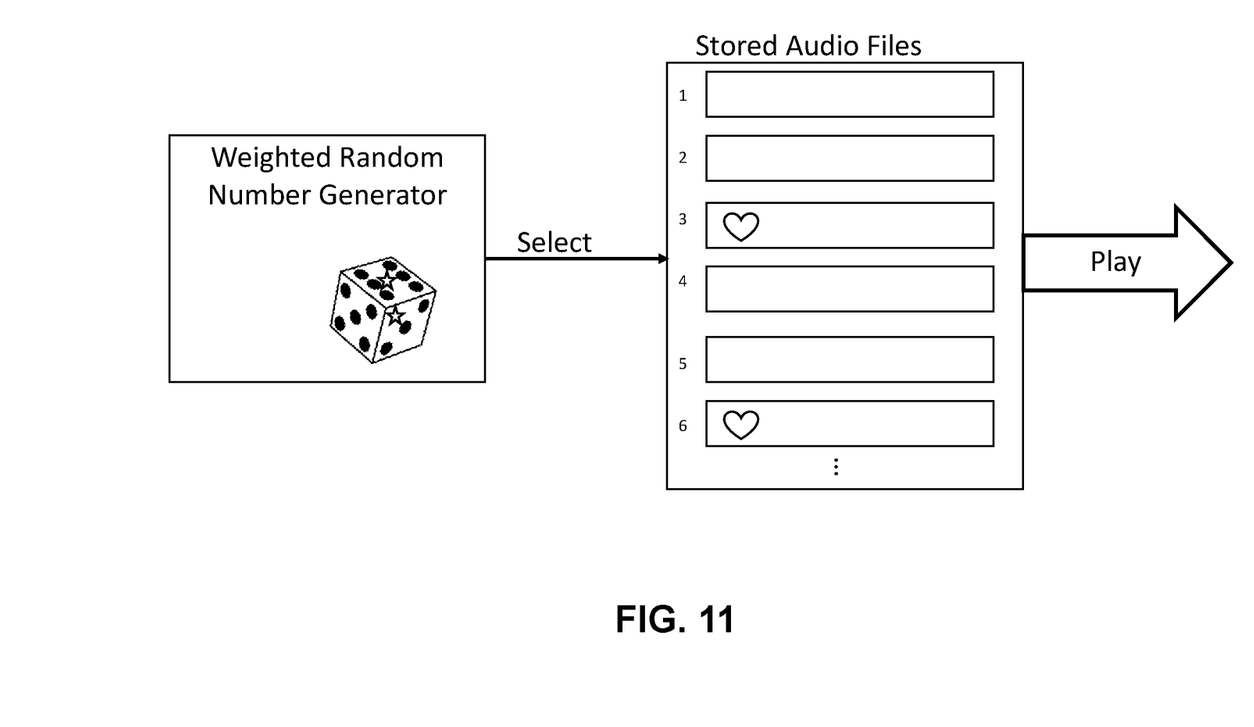
FIG. 11 shows an example weighted random selection process.

FIG. 10 shows how the processor may perform playback. In this example embodiment, when an Image X is displayed, the processor determines from user control input (seconds of screen time per picture) how long to display the current picture. The processor thus proceeds to display a sequence of images one after the other in a predetermined and/or random order—or a pattern recognizer could be used to select a next picture to display after determining that a further picture should be associated with the currently displayed picture. Before a picture is displayed, the processor searches tags of stored audio segments to determine whether any of the tags are associated with the currently displayed picture. If such tags exist, then the processor randomly selects a segment for playback with image X, weighting "Loved" segments higher than "Kept" segments for selection (see FIG. 11 which graphically illustrates a weighted random number generator as a die with star sides weighted to be more likely to be selected—of course the processor algorithm does not use a manual die but rather a weighted random sampling/selection algorithm—see for example Efraimidis, P. S. (2015). Weighted Random Sampling over Data Streams. In: Zaroliagis, C., Pantziou, G., Kontogiannis, S. (eds) Algorithms, Probability, Networks, and Games. Lecture Notes in Computer Science( ), vol 9295. Springer, Cham. https://doi.org/10.1007/978-3-319-24024-4_12). The processor may select another audio segment to play depending on the setting of the "Voice Comment Frequency" slider of FIG. 4 and the amount of time remaining for the current picture to be displayed. For example, if the recorded audio segments are of variable duration, the processor may select between as yet unplayed audio segments to maximize voice narrative during but not exceed the picture display duration. Once the processor chooses an auto comment and plays it, the picture will stay displayed until the audio comment is done playing and time is up. If after playing and audio comment the screen time timer has not run out, the processor can choose another audio comment to play. The processor in one embodiment is configured to keep track of which audio segments it has recently played in association with a particular image and select between different audio segments the next time the same image is displayed to provide variety of narration and thereby increase interest.

All patents and publications cited above are incorporated herein by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A system for recording audio in association with stored images comprising:
   at least one processor,
   a sound processing circuit,
   a display,
   at least one memory device connected to the at least one processor and the display, the at least one memory device storing images for display;
   a microphone connected to the sound processing circuit; and
   at least one user input device connected to the at least one processor, the at least one processor configured to enable a user speaking into the microphone to record a set of audio segments to be played back while a particular image is displayed, the at least one processor being further configured to select a subset of the recorded audio segments as favorites in response to user input from the at least one user input device and to configure the system to play the selected subset of the recorded audio segments more often while the particular image is displayed than other recorded audio segments in the set, based on a weighted random selection that takes into account whether any of the audio segments have been indicated as preferred over other audio segments.

2. The system of claim 1 wherein the system further includes a sound output transducer connected to the sound processing circuit, the sound output transducer reproducing a sequence of the selected favorites while the particular image is displayed on the display.

3. The system of claim 1 wherein the system is further configured to play the recorded audio segments back in random order and with variable frequency while giving playback priority to the selected subset of the recorded audio segments.

4. The system of claim 1 wherein the at least one processor is further configured to play back only favorite recorded audio segments, only non-favorite recorded audio segments, or both favorite and non-favorite recorded audio segments.

5. The system of claim 1 wherein the at least one processor is further configured to convert spoken voice to text during recording and displaying the text on the display to help the user make a decision as to indicate a preference for the spoken voice, and then discard the text.

6. A system comprising:
   a processor;
   a display;
   a sound transducer; and
   a non-transitory memory operatively coupled to the processor, the memory storing program control instructions that when executed by the processor, cause the processor to perform operations comprising:
   (a) select an image for display on the display;
   (b) determine whether plural audio segments associated with the selected image for display exist; and
   (c) when the determining determines plural audio segments associated with the selected image for display do exist, select and play back said plural audio segments based on a weighted random selection that takes into account whether any of the audio segments have been indicated as preferred over other audio segments.

7. The system of claim 6 wherein the random selection takes into account whether the audio segments are indicated as "Loved" as opposed to "Liked", thereby increasingly the likelihood that the audio segments will be played instead of other audio segments while the associated selected image is being displayed.

8. The system of claim 6 wherein the processor is configured to provide a weighted random value generator to generate a random value used to select between plural recorded audio segments.

9. The system of claim 6 wherein each audio segment comprises a voice narrative.

10. The system of claim 6 wherein the processor is further configured to display the displayed image for a time period selected by a user.

11. The system of claim 6 wherein the processor is further configured to select a number or combined duration of audio segments associated with the displayed image depending on a voice comment frequency setting.

12. A method performed by at least one processor connected to a display, a sound transducer, and a non-transitory memory operatively coupled to the at least one processor, comprising:
   selecting an image for display on the display;
   determining that plural audio segments associated with the image selected for display exist; and
   based on determining plural audio segments associated with the selected image for display exist, selecting and playing back said plural audio segments only during display of the image selected for display based on a weighted random selection that takes into account whether any of the plural audio segments have been indicated as preferred over other ones of the plural audio segments.

13. The method of claim 12 wherein the random selection takes into account whether an audio segment is indicated as "Loved" as opposed to "Liked", thereby increasingly the likelihood that the audio segment will be played instead of another audio segment.

14. The method of claim 12 wherein the method further comprises generating a random value used to select between plural recorded audio segments.

15. The method of claim 12 wherein each audio segment comprises a voice narrative.

16. The method of claim 12 wherein the method further comprises displaying the displayed image for a time period selected by a user.

17. The method of claim 12 wherein method further comprises selecting a number or combined duration of audio segments associated with the displayed image depending on a voice comment frequency setting.

18. The method of claim 12 further comprising displaying an image with more comments or more lengthy comments on the screen longer, and automatically determining how long to display a particular image based on how much stored audio content and/or how much preferred stored audio content is associated with the image.

* * * * *